United States Patent [19]
Lee

[11] Patent Number: 6,124,879
[45] Date of Patent: Sep. 26, 2000

[54] VISUAL TELEPHONE SYSTEM AND METHOD CAPABLE OF CONTROLLING THE USE OF A TELEPHONE LINE

[75] Inventor: Surg-June Lee, Seoul, Rep. of Korea

[73] Assignee: SamSung Electronics Co., Ltd., Suwon, Rep. of Korea

[21] Appl. No.: 08/889,847

[22] Filed: Jul. 8, 1997

[30] Foreign Application Priority Data

Jul. 8, 1996 [KR] Rep. of Korea ...................... 96-27519

[51] Int. Cl.⁷ .............................. H04N 4/14; H04M 11/00
[52] U.S. Cl. .......................... 348/14; 379/93.09; 379/184
[58] Field of Search .......................... 348/14–17; 379/29, 379/34, 93.05, 93.09, 93.17, 93.23, 93.25, 258, 263, 274, 277, 377, 380–382, 100.06, 164, 168, 184, 100.15, 100.16

[56] References Cited

U.S. PATENT DOCUMENTS

| | | |
|---|---|---|
| 3,946,158 | 3/1976 | Leclereq et al. . |
| 4,220,825 | 9/1980 | Fahey ...................................... 379/380 |
| 4,320,260 | 3/1982 | Lechner ..................................... 379/29 |
| 4,802,207 | 1/1989 | Uchida ..................................... 379/164 |
| 4,932,047 | 6/1990 | Emmons et al. . |
| 4,985,911 | 1/1991 | Emmons et al. . |
| 5,022,071 | 6/1991 | Mozer et al. ....................... 379/100.16 |
| 5,077,784 | 12/1991 | Fujita et al. ............................... 348/14 |
| 5,109,407 | 4/1992 | Fujita et al. . |
| 5,388,153 | 2/1995 | Burger et al. ............................. 379/164 |
| 5,471,525 | 11/1995 | Domoto et al. .......................... 379/164 |
| 5,502,760 | 3/1996 | Gilbert et al. ............................ 379/184 |
| 5,506,891 | 4/1996 | Brown ................................. 379/100.06 |
| 5,521,974 | 5/1996 | Hayashi et al. ..................... 379/100.06 |
| 5,533,117 | 7/1996 | Kim .......................................... 379/164 |
| 5,541,640 | 7/1996 | Larson ................................. 379/93.17 |
| 5,557,658 | 9/1996 | Gregorek et al. .................... 379/93.25 |
| 5,610,975 | 3/1997 | Tsuchida . |
| 5,668,870 | 9/1997 | Dahlquist ................................ 379/164 |
| 5,727,056 | 3/1998 | Lee .......................................... 379/164 |
| 5,812,646 | 9/1998 | Kikuchi ................................ 379/93.09 |

Primary Examiner—Curtis A. Kuntz
Assistant Examiner—George Eng
Attorney, Agent, or Firm—Robert E. Bushnell, Esq.

[57] ABSTRACT

A visual telephone system is disclosed which comprises a modem for transmitting and receiving video and voice signals so as to perform a visual communication via a telephone line connected therewith, a telephone hand set for a voice communication via the telephone line connected therewith, a detecting unit for detecting whether or not the telephone line is busy and generating a line state detection signal, a control unit for controlling the modem to be enabled in response to the line state detection signal and generating a switch control signal in response to a specific key entry, a switch for selectively connecting the telephone line to either the modem or the telephone hand set, and a message storage unit for storing a message so as to provide the message on a display or a speaker in response to the line state detection signal.

19 Claims, 7 Drawing Sheets

6,124,879

VISUAL TELEPHONE SYSTEM AND METHOD CAPABLE OF CONTROLLING THE USE OF A TELEPHONE LINE

CLAIM FOR PRIORITY

This application makes reference to, incorporates the same herein, and claims all benefits accruing under 35 U.S.C. §119 from an application for METHOD AND APPARATUS FOR CONTROLLING USE OF A TELEPHONE LINE earlier filed in the Korean Industrial Property Office on Jul. 8 1996, and there duly assigned Serial No. 96-27519, a copy of which application is annexed hereto.

BACKGROUND OF THE INVENTION

1. Technical Field

The present invention generally relates to a visual telephone system, and more particularly relates to a visual telephone system connected to a telephone line for controlling the use of such a telephone line connected to a telephone switching network.

2. Related Art

Generally, there may be connected a number of telephone sets to a single telephone network line which has a specific call number.

Visual telephones may be connected to such a signal transmission line (i.e., a telephone network line) so as to transmit and receive audio (i.e., voice) and visual (i.e., video) information to/from another visual telephone via the telephone network line. If the communication between calling and called visual telephones over the telephone network line is achieved, audio communication is possible, but visual communication is impossible. This is because audio and visual signals must be simultaneously transmitted and received between the calling and called visual telephones. Thus, in order to transmit and receive the audio signal simultaneously with the visual signal via a telephone network line, each visual telephone must include a modem device for converting analog information which contain audio and visual signals into digital information.

During the visual communication of a calling visual telephone with a called visual telephone via a telephone network line therebetween, when another visual or audio telephone connected with the telephone network line is off-hooked by a caller, the visual communication is stopped because noise is introduced into the telephone network line. In order to solve the problem an, LED (light emitting diode) is installed on a body of a visual telephone connected to a telephone network so as to indicate whether or not another visual telephone is being connected to the telephone network line. However, even when the LED installed on the visual telephone is turned on, another visual telephone which is commonly connected with the telephone network line may be involuntarily off-hooked by a caller, such that the visual communication of the visual telephone with another visual telephone is stopped because of noise introduction as described above.

SUMMARY OF THE INVENTION

Accordingly, it is therefore an object of the present invention to provide a visual telephone system and a method of controlling the same such that, during connection of another visual telephone with a telephone network, is capable of blocking the connection of the visual telephone system to the telephone network and displaying a message so as to notify a caller that the visual telephone system cannot be utilized.

It is another object of the present invention to provide a visual telephone system and a method of controlling the same such that, during visual communication of another visual telephone with another visual telephone over a telephone network, is capable of blocking the connection of the visual telephone system to the telephone network and displaying a message so as to notify a caller that the visual telephone system cannot be utilized.

According to an aspect of the present invention, a visual telephone system comprises a modem for transmitting and receiving video and voice signals so as to perform a visual communication via a telephone line connected therewith; a telephone hand set for a voice communication via the telephone line connected therewith; a detecting unit for detecting whether or not the telephone line is busy and generating a line state detection signal; a control unit for controlling the modem to be enabled in response to the line state detection signal and generating a switch control signal in response to a specific key entry; a switch for selectively connecting the telephone line to either the modem or the telephone hand set; and a message storage unit for storing a message so as to provide the message on a display or a speaker in response to the line state detection signal.

Preferably, the detecting unit comprises a line voltage detector for detecting a voltage on the telephone line, a reference voltage generator for generating a reference voltage, and a comparator for comparing the voltage detected thus with the reference voltage and generating the line state detection signal. Alternatively, the detecting unit comprises a microcomputer for performing a line state detecting routine which has the steps of detecting a voltage on the telephone network line; and comparing the voltage detected thus with a preset reference voltage to generate the line state detection signal.

According to another aspect of the present invention, a visual telephone system comprises a modem for transmitting and receiving video and voice signals so as to perform a visual communication via a telephone line connected therewith; a telephone hand set for a voice communication via the telephone line connected therewith; a detecting unit for detecting whether or not the telephone line is busy and generating a line state detection signal; a control unit for controlling the modem to be enabled in response to the line state detection signal and generating a switch control signal in response to a specific key entry and a switch on/off control signal in response to the line state detection signal; a first switch for selectively connecting the telephone line to either the modem or the telephone hand set in response to the switch control signal; a message storage unit for storing a message so as to provide the message on a display or a speaker in response to the line state detection signal; and a second switch for disconnecting the telephone line to the visual telephone network in response to the switch on/off control signal.

According to a further aspect of the present invention, a method for controlling use of a telephone network line in accordance with whether the telephone network line is busy, which comprises the steps of determining whether there is a request for communication in a visual telephone system; detecting a state of the telephone network line to generate a line state detection signal; determining whether or not the telephone network line is busy in accordance with logic levels of the line state detection signal; generating, if the telephone network line is busy, a message to the visual telephone system determining, if the telephone network line is not busy, whether or not a visual communication mode is set by a specific key entry; performing, if the visual communication mode is not set, a voice telephone communication until the voice telephone communication is terminated; enabling, if the visual communication mode is set, a modem to allow for connection with the telephone network line and be activated for dialing; performing a visual telephone communication in the visual communication mode; determining whether the visual telephone communication is terminated; and disabling the modem when the communication is terminated.

According to an additional aspect of the present invention, a method is provided for controlling use of a telephone network line in accordance with whether the telephone network line is busy, which comprises the steps of determining whether there is a request for communication in a visual telephone system; detecting a state of the telephone network line to generate a line state detection signal; determining whether or not the telephone network line is busy in accordance with logic levels of the line state detection signal; generating, if the telephone network line is busy, a message to the visual telephone system of performing the method; disconnecting the visual telephone system from the telephone network line; determining, if the telephone network line is not busy, whether or not a visual communication mode is set by a specific key entry; performing, if the visual communication mode is not set, a voice telephone communication until the voice telephone communication is terminated; connecting, if the visual communication mode is set, a modem to the telephone network line; enabling a modem to allow for connection with the telephone network line and be activated for dialing; performing a visual telephone communication in the visual communication mode; determining whether the visual telephone communication is terminated; disabling the modem when the communication is terminated; and disconnecting the modem from the telephone network line.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
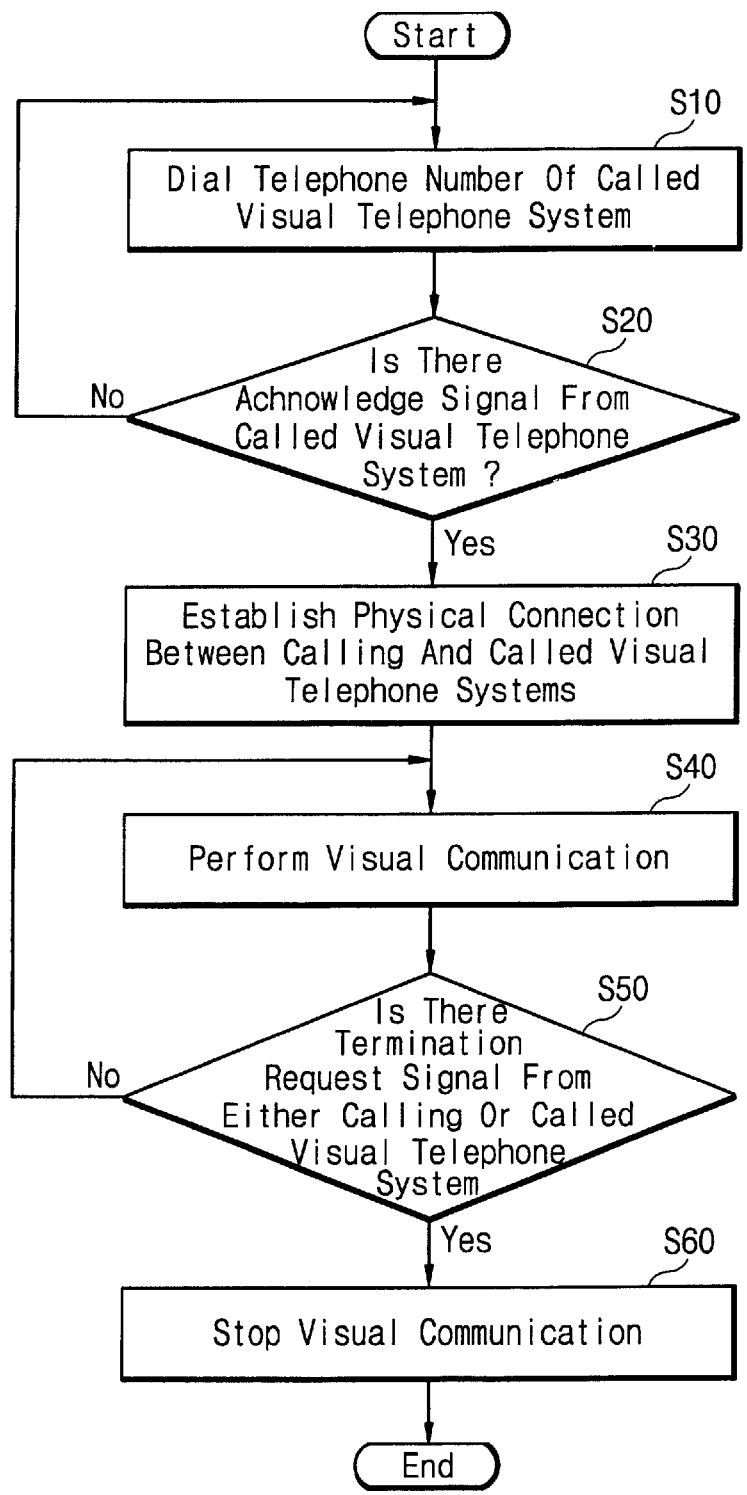
FIG. 1 is a flowchart of a contemporary process of performing visual communication between calling and called visual telephone systems through a telephone line of a telephone network.

Referring now to the drawings and particularly to FIG. 1, which illustrates a contemporary technique of performing visual communication between calling and called visual telephones through a telephone line of, for example, a public switching telephone network (PSTN), each of which has a modem device. As shown in FIG. 1, the contemporary technique uses steps of dialing a telephone number of a called visual telephone system via a telephone line at step S10, determining whether there is an acknowledge signal generated from the called visual telephone at step S20, establishing physical connection between the calling visual telephone and the called visual telephone if the acknowledge signal is generated from the called visual telephone at step S30, performing visual communication of the calling visual telephone with the called visual telephone at step S40, determining whether there is a termination request signal generated from either the calling or the called visual telephone at step S50, and terminating the visual communication of the calling visual telephone with the called visual telephone if the termination request signal is generated from the calling or the called visual telephone at step S60.

During the visual communication between the calling visual telephone and the called visual telephone via a telephone line of a telephone network therebetween, when another visual or audio telephone set connected to the telephone line is taken off-hook by a caller, the visual communication is typically disabled because noise is introduced into the telephone network line. In order to solve this problem, a light emitting diode (LED) is installed on a body of a visual telephone connected to a telephone line for indicating whether another visual telephone is being connected to the telephone line of the telephone network. However, even when the LED installed on the visual telephone is turned on, another visual telephone which is also commonly connected to the telephone line maybe involuntarily off-hooked by a caller, the visual communication of the visual telephone with another visual telephone being stopped because of noise introduction as described above.

Figure 2:
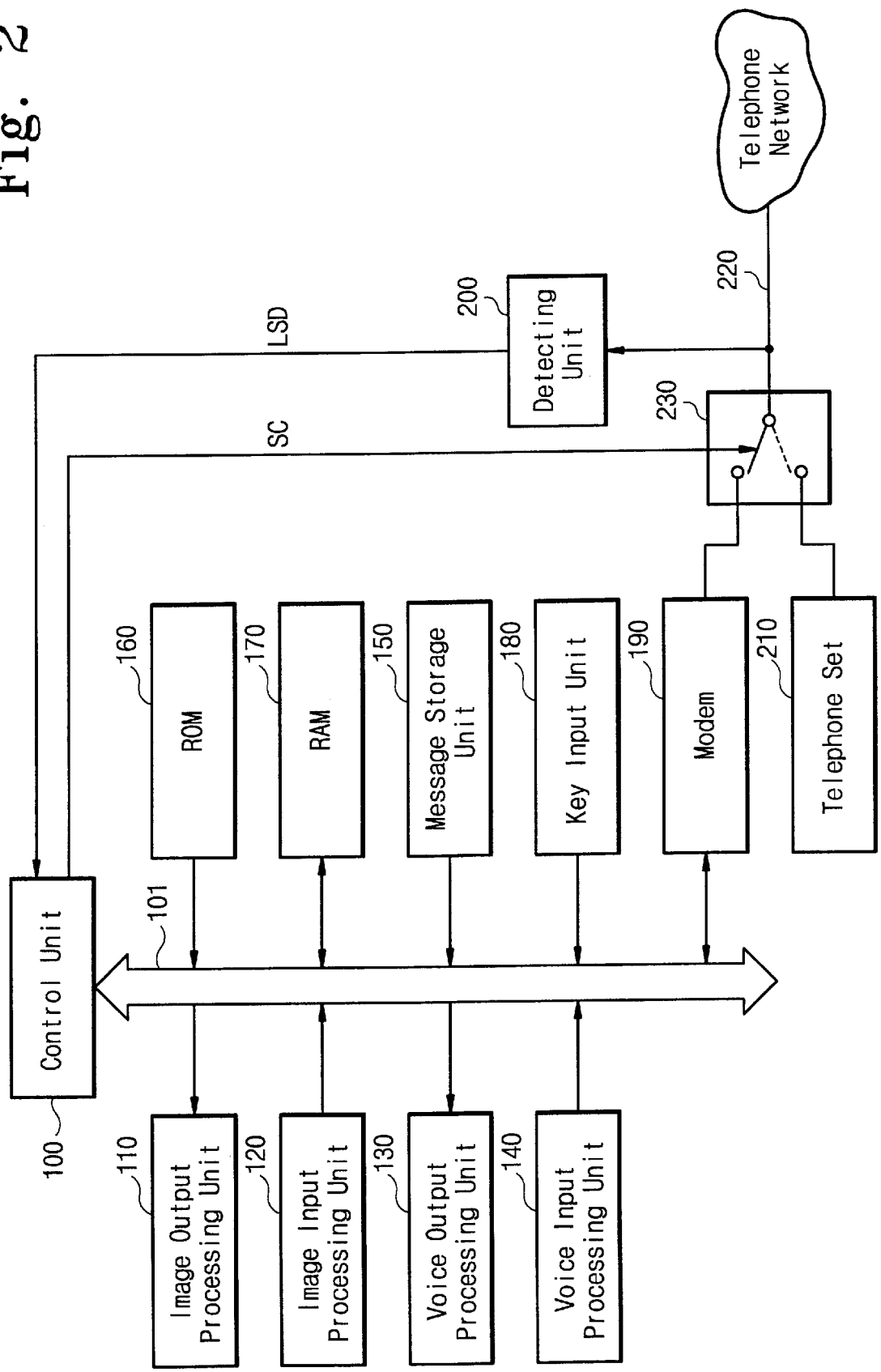
FIG. 2 is a block diagram of a visual telephone system constructed according to an embodiment of the present invention.

Turning now to FIG. 2, which illustrates a novel visual telephone system constructed in accordance with an embodiment of the present invention. The novel visual telephone system includes a detecting unit 200 for detecting whether a telephone line 220 of a telephone network is busy and generating a line state detection signal LSD, a control unit 100 for controlling an entire operation of the visual telephone system including performing a control routine in response to the line state detection signal LSD, a switch 230 for connecting the telephone line 220 to either a modem 190 or a telephone set 210 under control of the control unit 100, and a message storage unit 150 for storing a message. With the control routine to be executed in the control unit 100, the novel visual telephone system can control the use of the telephone line 220 of a telephone network according to whether the telephone line 220 is busy. Accordingly, the visual telephone system is capable of detecting whether or not the telephone line 220 is busy and controlling the use of the telephone line 220. If the telephone line 220 is busy, for instance, when the telephone line 220 is being used by another telephone set or another visual telephone system commonly connected thereto, the visual telephone system according to the present invention is not connected to the telephone line 220 so as not to communicate with a called telephone or a called visual telephone over the telephone line 220. If the telephone line is not busy, however, the novel visual telephone system is electrically connected to the telephone line 220 of the telephone network so as to communicate with the called telephone or the called visual telephone connected thereto.

As shown in FIG. 2, the visual telephone system further comprises an image output processing unit 110 (i.e., a monitor), an image input processing unit 120 (i.e., a CCD camera), a voice output processing unit 130 (i.e., a sound card), a voice input processing unit 140 (i.e., a microphone), a key input unit 180 (i.e., a key matrix) and a memory section. This memory section includes a read-only-memory (ROM) 160 and a random-access-memory (RAM) 170. The control unit 100 executes control programs stored in the ROM 160 so as to control the entire operation of the visual telephone system.

Figure 3:
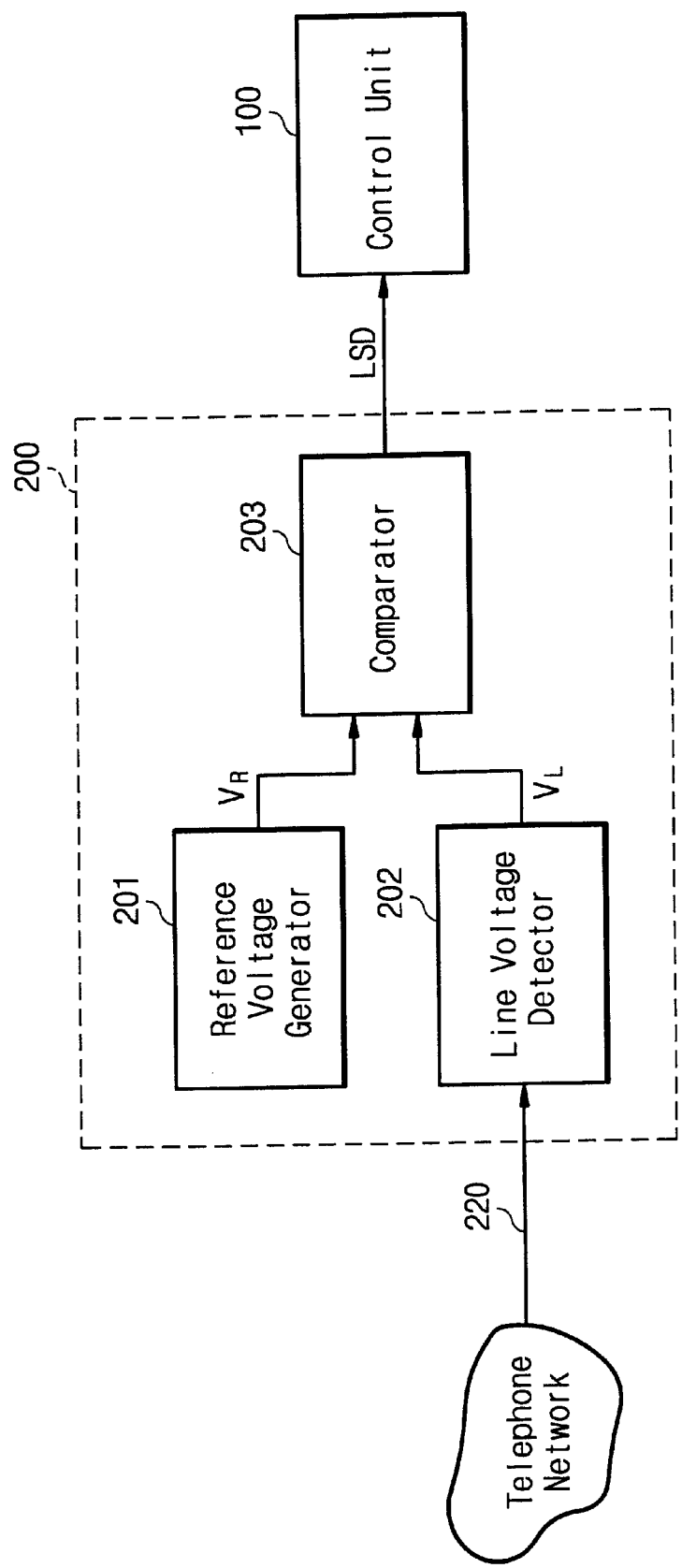
FIG. 3 is a detailed block diagram of the detecting unit as shown in FIG. 2.

The detecting unit 200 is connected between the control unit 100 and the telephone line 220 connected to the telephone network so as to detect whether or not the telephone line 220 is busy. The detecting unit 200 includes, as shown in FIG. 3, a line voltage detector 202 for detecting a voltage $V_L$ of the telephone line 220, a reference voltage generator 201 for generating a reference voltage $V_R$ corresponding to the voltage applied to the telephone line 220 at a busy state, a comparator 203 for comparing the detected voltage $V_L$ with the reference voltage $V_R$ to generate the line state detection signal LSD to the control unit 100. The line state detection signal LSD indicates whether or not the telephone line 220 is busy. The telephone line 220 generally exhibits a voltage of about 40 to 50 volts when it is not at a busy state, and its voltage is dropped to about 10 volts when it is at a busy state. By utilizing the drop of telephone line voltage, the detecting unit 200 is capable of generating the line state detection signal LSD.

Additionally, when the telephone line 220 is at a busy state, the control unit 100 generates a control signal through a system bus 101 to the message storage unit 150 as shown in FIG. 2. At this time, a message is read out from the message storage unit 150 in response to the control signal and provided to the image output processing unit 110 (i.e., monitor) and/or the voice output processing unit 130 (i.e., sound card) of the visual telephone system. That message may be, for instance, "Please note that you cannot use the telephone line now". Thus, a subscriber can recognize whether or not the telephone line is busy.

Figure 4:
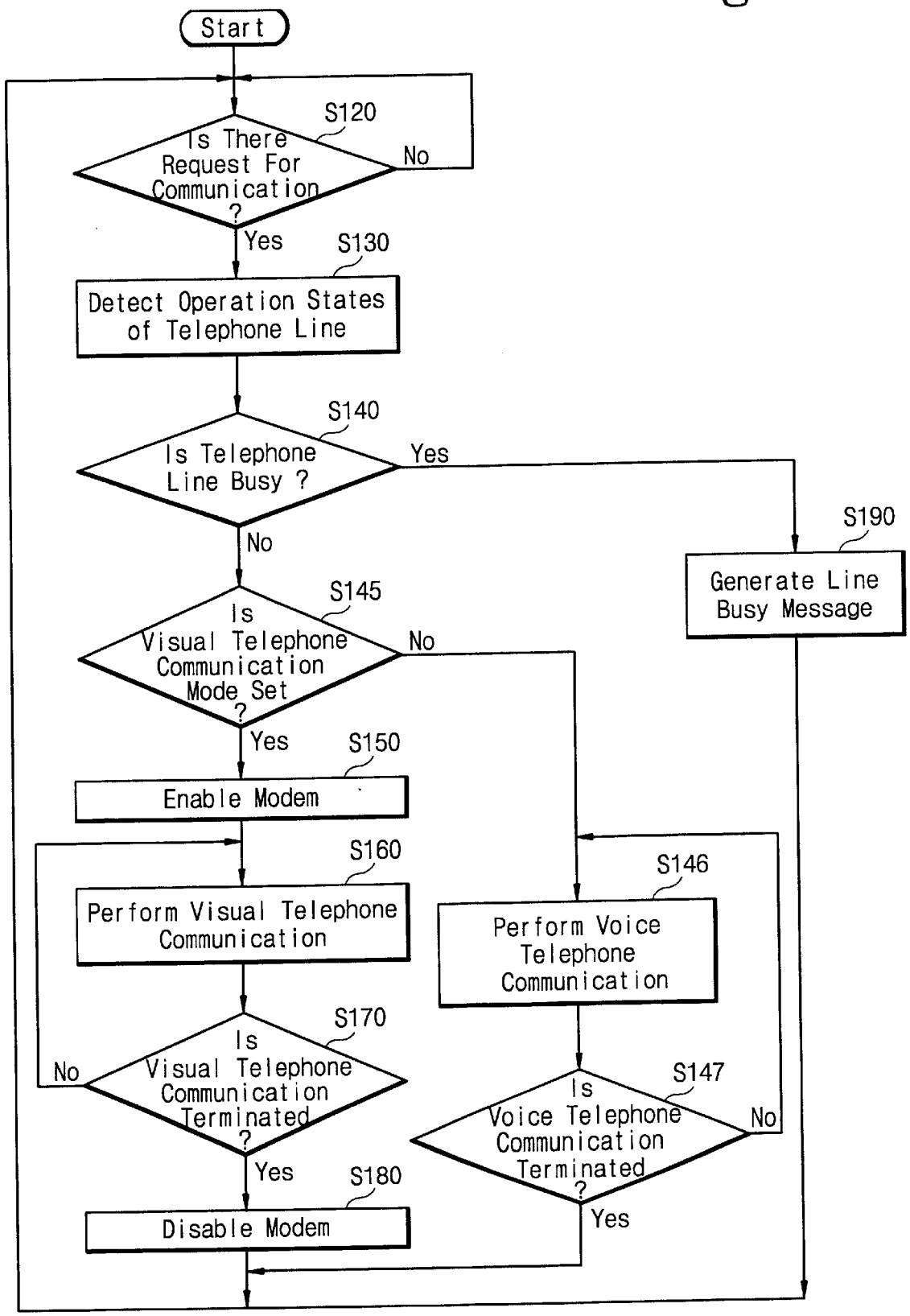
FIG. 4 is a flowchart of a novel process of controlling the use of a telephone line in the visual telephone system as shown in FIG. 2.

A process of controlling the use of a telephone line connected to a telephone network or a switching system in the novel visual telephone system will now be described with reference to FIG. 4 hereinbelow. A control program which is stored in ROM 160 of the visual telephone system as shown in FIG. 2 is executed by means of the control unit 100. The visual telephone system of FIG. 2 is capable of controlling the use of the telephone network line in accordance with a busy state thereof.

First, the control unit 100 of each visual telephone system determines whether there is a request for communication in the visual telephone system at step S120. If a telephone number of a subscriber is input by the key input unit 180 of the visual telephone system, the control unit 100 generates a hook-off signal in response to the input telephone number and provides the hook-off signal to the modem 190. The modem 190 is at a stand-by state for dialing and the control unit 100 recognizes the stand-by state of the modem 190 as the request for communication.

Figure 5:
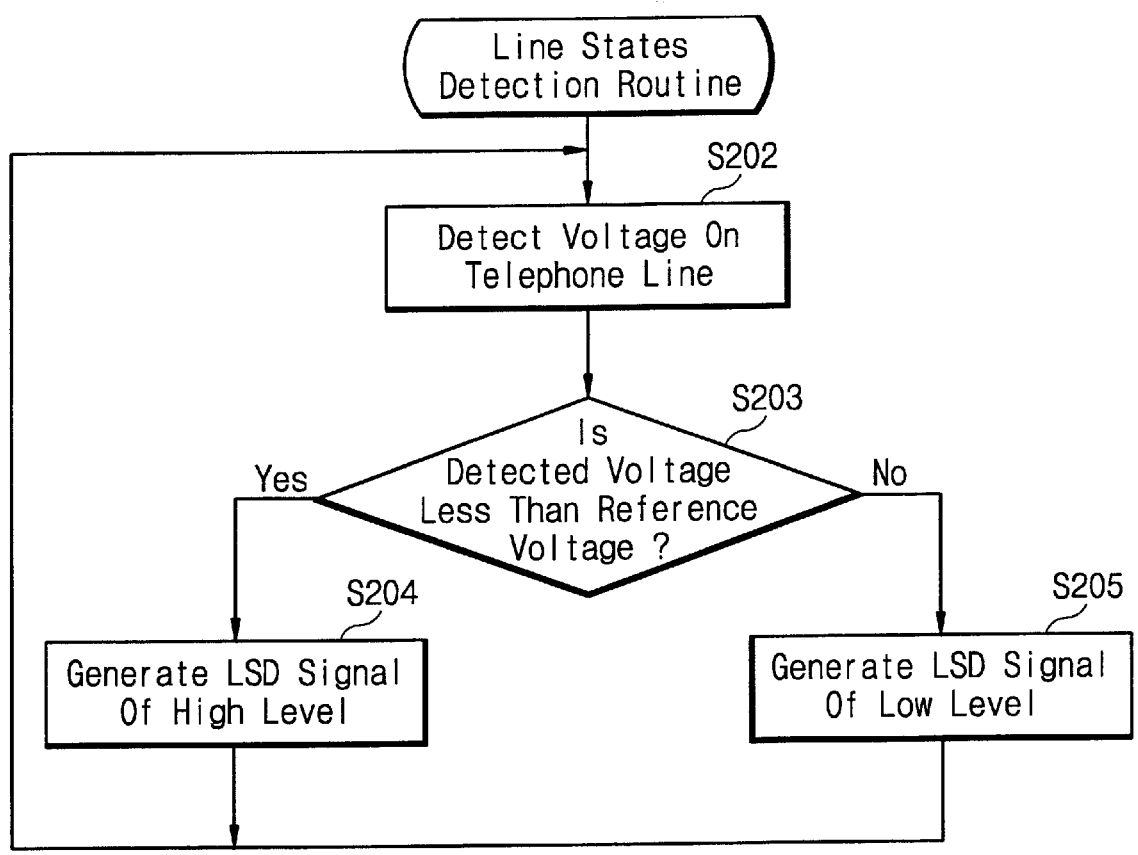
FIG. 5 is a flowchart of a process of detecting a busy state of a telephone line using the detecting unit as shown in FIG. 2.

At step S130, the detecting unit 200 detects an operation status of the telephone line 220 in accordance with a line status detection routine as shown in FIG. 5 and generates a line state detection signal LSD indicating whether or not the telephone line 220 is busy. The line status detection routine is performed by a micro-computer which constitutes the detecting unit 200. As shown in FIG. 5, the detecting unit 200 of the micro-computer detects a voltage on the telephone line 220 at step S202, and compares the detected voltage with a reference voltage at step S203. If the detected voltage is less than the reference voltage, the detecting unit 200 generates a line state detection signal of a high level at step S204. If the detected voltage is not less than the reference voltage, the detecting unit 200 generates a line state detection signal of a low level at step S205. It is noted herein that the line state detection signal of a high level indicates that the telephone network line 220 is at a busy state, and that the line state detection signal of a low level indicates that the telephone network line 220 is not at a busy state. Alternatively, the line state detection signal can be detected by the detecting unit 200 which is composed of the reference voltage generator 201, the line voltage detector 202 and the comparator 203, as shown in FIG. 3.

Referring back to FIG. 4, at step S140, if the line state detection signal is at a high level, i.e., when the telephone line 220 is busy, the control unit 100 proceeds to step S190, wherein a line busy message is read out from the message storage unit 150 under the control of the control unit 100 and provided to the image output processing unit 110 (i.e., monitor) and/or the voice output processing unit 130 (i.e., sound card) of the visual telephone system. Thus, the line busy message indicating that the telephone line 220 is at a busy state may be generated by the sound card in a voice and/or by displayed on the monitor.

Alternatively, at step S140, if the line state detection signal is at a low level, i.e., when the telephone line 220 is not busy, the control unit 100 proceeds to step S145, wherein it is determined whether or not a visual telephone communication mode is set by a subscriber. If the visual telephone communication mode is set, i.e., if a switch control signal SC is generated from the control unit 100 in accordance with a specific key entry through the key input unit 180, the control unit 100 proceeds to step S150 wherein the switch 230 is controlled in response to the switch control signal SC to allow the modem 190 to be connected to the telephone line 220 and at the same time the control unit 100 enables the modem to be activated. The activation of the modem 190 means that a dialing tone signal is generated on the basis of the call telephone number. Next, the visual telephone system performs visual telephone communication at step S160.

At step S170, the control unit 100 determines whether the visual telephone communication is terminated. If the visual telephone communication is terminated, the control unit 100 proceeds to step S180 to deactivate or disable the modem 190. If the visual telephone communication is not terminated, the control unit 100 returns to step S160 to maintain the visual telephone communication. On the other hand, at step S145, if the visual communication mode is not set by the subscriber, i.e., when a voice communication mode is set, the control unit 100 proceeds to step S146 wherein the switch 230 is controlled in response to the switch control signal SC to allow the telephone set 210 to be connected to the telephone line 220 and at the same time a voice telephone communication is performed. Next, the control unit 100 determines whether the voice telephone communication is terminated at step S147. If the voice telephone communication is terminated, the control unit 100 returns to step S120, and if not, the control unit 100 returns to step S146 to maintain the voice telephone communication.

Figure 6:
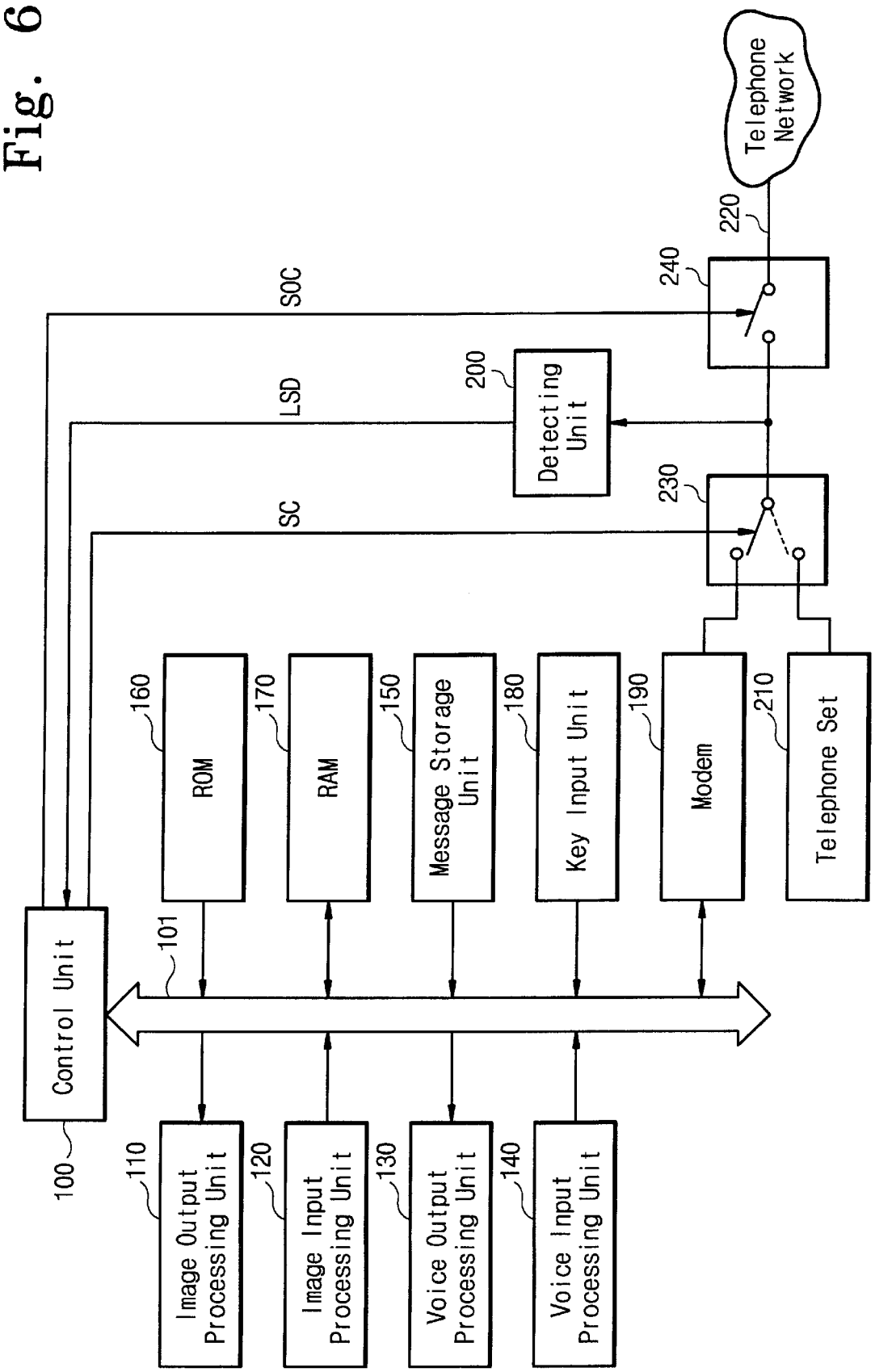
FIG. 6 is a block diagram of a visual telephone system constructed according to another embodiment of the present invention.

FIG. 6 illustrates a novel visual telephone system constructed according to another embodiment of the present invention. In addition to those circuit embodiments as shown in FIG. 2, the second embodiment of the visual telephone system further includes a second switch 240 connected between switch 230 and the telephone line 220 so that electrical connection therebetween is controlled by the control unit 100. As shown in FIG. 6, the detecting unit 200 detects that the telephone line 220 is at a busy state, and then generates a line state detection signal LSD, so that the control unit 100 can generate a switch on/off control signal SOC in response to the line state detection signal LSD. At this time, for instance, when the telephone line 220 is busy, the telephone line 220 and the switch 230 is disconnected by the switch 240 controlled in response to the switch on/off control signal SOC.

Figure 7:
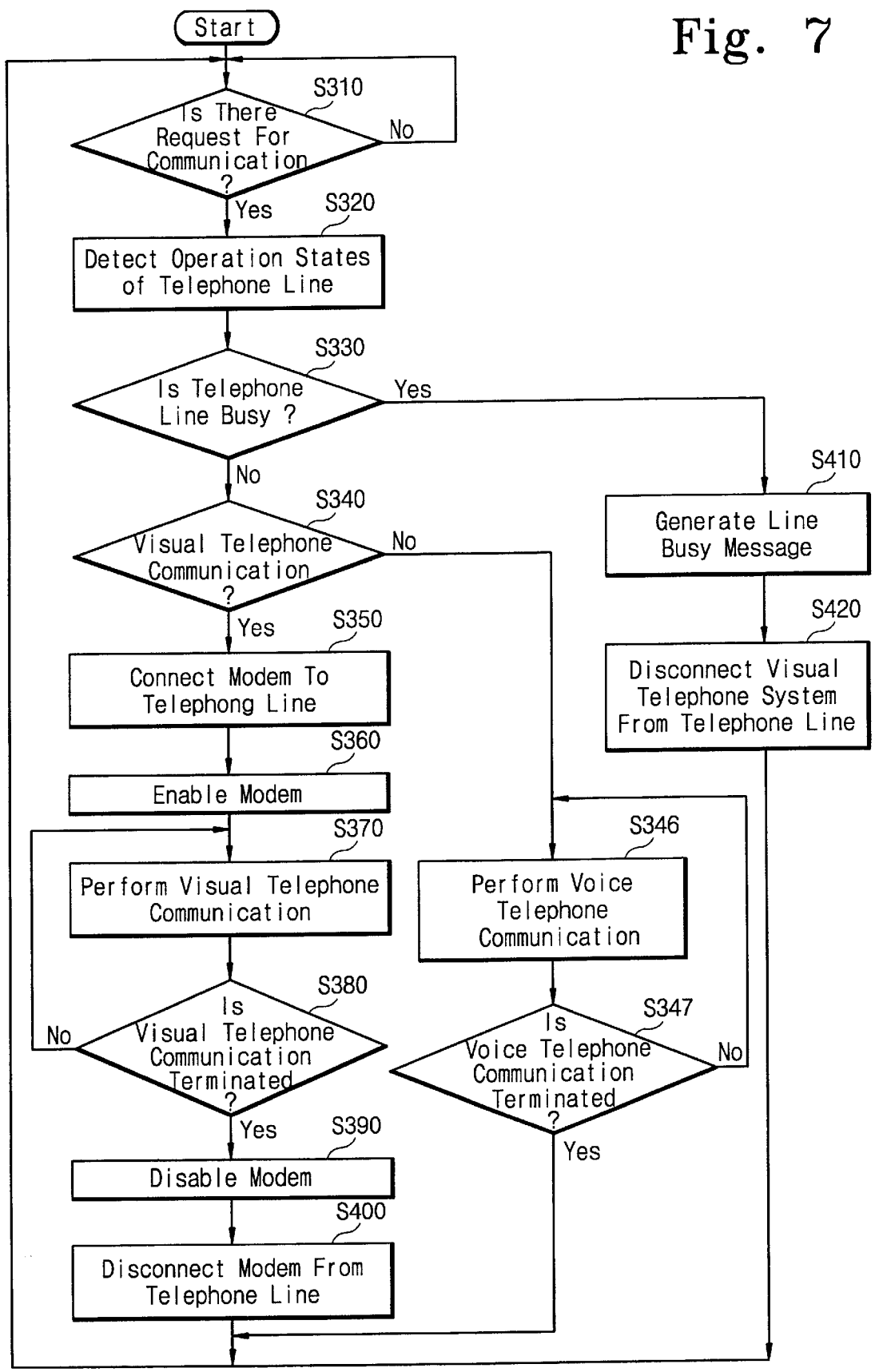
FIG. 7 is a flowchart of a process of controlling the use of a telephone line in the visual telephone system as shown in FIG. 6.

FIG. 7 illustrates a process of controlling the use of the telephone line 220 connected to a telephone network or a switching system in the novel visual telephone system as shown in FIG. 6. The process of FIG. 7 has the same steps as that of FIG. 4 except that, after the modem 190 is disabled, the telephone set 210 is connected to the telephone line 220, and after the line busy message is generated from the message storage unit 150, the visual telephone network is disconnected with the telephone line 220 by the switch 240 controlled in response to the switch on/off control signal SOC from the control unit 100.

Refer now to FIG. 7, the control unit 100 determines whether there is a request for communication in the visual telephone system at step S310. If a call telephone number of a subscriber is input by the key input unit 180 of the visual telephone system, the control unit 100 generates a hook-off signal in response to the call telephone number and provides the hook-off signal to the modem 190. The modem 190 is at a stand-by state for dialing and the control unit 100 recognizes the stand-by state of the modem 190 as the request for communication.

At step S320, the detecting unit 200 detects an operation status of the telephone line 220 in accordance with a line status detection routine as shown in FIG. 5 and generates a line state detection signal LSD indicating whether or not the telephone line 220 is busy. The line status detection routine is performed in a micro-computer which constitutes the detecting unit 200. As shown in FIG. 5, the detecting unit 200 detects a voltage on the telephone network line 220 at step S202, and compares the detected voltage with a reference voltage at step S203. If the detected voltage is less than the reference voltage, the detecting unit 200 generates a line state detection signal of a high level at step S204. If the detected voltage is not less than the reference voltage, the detecting unit 200 generates a line state detection signal of a low level at step S205. The line state detection signal of a high level indicates that the telephone network line 220 is at a busy state, and the line state detection signal of a low level indicates that the telephone network line 220 is not at a busy state.

At step S330, if the line state detection signal is at a high level, i.e., when the telephone network line 220 is busy, the control unit 100 proceeds to step S410, wherein a line busy message is read out from the message storage unit 150 by means of the control of the control unit 100 and provided to the monitor and/or the sound card of the visual telephone system. Thus, the line busy message indicating that the telephone network line 220 is at busy state may be generated by the sound card in a voice and/or by displayed on the monitor. And, the control unit 100 proceeds to step S420, wherein the switch 240 is controlled in response to the switch on/off control signal SOC from the control unit 100 so that the visual telephone system, particularly, the switch 230 is disconnected with the telephone network line 220.

Alternatively, at step S330, if the line state detection signal is at a low level, i.e., when the telephone network line 220 is not busy, the control unit 100 determines whether or not a visual communication mode is set by a subscriber at step S340. If the visual communication mode is set, i.e., if a switch control signal SC is generated from the control unit 100 in accordance with a specific key entry through the key input unit 180, the control unit 100 proceeds to step S350 wherein the switch 230 is controlled in response to the switch control signal SC to allow the modem 190 to be connected to the telephone network line 220. Next, the control unit 100 enables activation of the modem 190 at step S360. The activation of the modem 190 indicates that a dialing tone signal is generated on the basis of the call telephone number. Next, at step S370, the visual telephone system performs visual telephone communication.

At step S380, the control unit 100 determines whether the visual telephone communication is terminated. If the visual telephone communication is terminated, the control unit 100 disables operation the modem 190 at step S390 and disconnects the modem from the telephone network line 220 at step S400 390. If the visual telephone communication is not terminated, the control unit 100 returns to step S370 to maintain the visual telephone communication until the visual telephone communication is terminated.

On the other hand, at step S340, if the visual communication mode is not set, i.e., when a voice communication mode is set, the control unit 100 proceeds to step S346 wherein the switch 230 is controlled in response to the switch control signal SC to allow the telephone set 210 to be connected to the telephone network line 220 and at the same time a voice telephone communication is performed. Next, the control unit 100 determines whether the voice telephone communication is terminated at step S347. If the voice telephone communication is terminated, the control unit jumps to step S120, and if not, the control unit 100 jumps to step S346 so that the voice telephone communication continues to be performed.

As described above, according to a visual telephone system of the present invention, when a subscriber using the system tries to call another subscriber via a telephone network, the system is connected to the telephone network line in accordance with the operation status of a telephone line, that is, whether the telephone line is busy. If the telephone line is busy, the system is not connected to the line so that it cannot perform visual communication. If the telephone line is not busy, the system is connected to the line so as to perform visual communication. Therefore, during the busy status of the telephone line connected to the telephone network, the visual telephone system is capable of blocking any connection attempt to the telephone network and outputting a message so as to notify the caller that the visual telephone system cannot be utilized.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A visual telephone system, comprising:

a telephone handset for voice telephone communication via a telephone line connected to a telephone network;

a modem for transmitting and receiving video and voice signals for visual telephone communication via said telephone line;

an electrically controlled first switch for selectively connecting and disconnecting the telephone line to and from one of the telephone handset for voicetelephone communication and the modem for visual telephone communication in response to a first switch control signal;

an electrically controlled second switch for selectively connecting and disconnecting the telephone line to and from the telephone network to the visual telephone system in response to a second switch control signal;

a detecting unit for detecting an operation status of the telephone line and generating a line status detection signal indicating whether the telephone line is busy;

a memory for storing a message indicating the operation status of the telephone line; and a control unit for controlling operation of the modem and reproduction of the message stored in said memory to alert a subscriber of the operation status of the telephone line in response to the line status detection signal, generating said first switch control signal in response to a specific key entry, and generating said second switch control signal in response to the line status detection signal, said second switch prohibiting the visual telephone system from being connected to said telephone line when said telephone line is busy.

2. The visual telephone system of claim 1, further comprised of said control unit reading the message stored in said memory to alert the subscriber, via one of a sound card and a visual display, that the telephone line is busy, when the line status detection signal indicates that the telephone line is busy.

3. The visual telephone system of claim 1, further comprised of said control unit determining whether said specific key entry from the subscriber represents one of a visual telephone communication mode and a voice telephone communication mode, and generating said first switch control signal accordingly.

4. The visual telephone system of claim 1, further comprised of said control unit generating said first switch control signal exhibiting a first state for connecting the telephone line to the modem and activating the modem to establish the visual telephone communication with a remote visual telephone system via said telephone network, and exhibiting a second state for connecting the telephone line to the telephone handset and enabling the telephone handset to establish the voice telephone communication with a remote telephone handset via said telephone network.

5. The visual telephone system of claim 1, further comprised of said detecting unit comprising:

a line voltage detector for detecting a voltage on the telephone line;

a reference voltage generator for generating a reference voltage; and a comparator for comparing the voltage detected by the line voltage detector with the reference voltage from the reference voltage generator, and generating the line status detection signal.

6. The visual telephone system of claim 4, further comprised of said detecting unit comprising:

a line voltage detector for detecting a voltage on the telephone line;

a reference voltage generator for generating a reference voltage; and a comparator for comparing the voltage detected by the line voltage detector with the reference voltage from the reference voltage generator, and generating the line status detection signal.

7. The visual telephone system of claim 1, further comprised of said detecting unit comprising a micro-computer having a line status detection routine incorporated therein for detecting a voltage on the telephone line, and for comparing a detected voltage with a preset reference voltage to generate the line status detection signal.

8. The visual telephone system of claim 5, further comprised of said detecting unit comprising a micro-computer having a line status detection routine incorporated therein for detecting a voltage on the telephone line, and for comparing a detected voltage with a preset reference voltage to generate the line status detection signal.

9. A method for controlling use of a telephone network line of a visual telephone system connected to a telephone network, comprising the steps of:

determining whether there is a request for communication via said visual telephone system;

detecting an operation state of the telephone network line to generate a line state detection signal;

determining whether the telephone network line is busy in accordance with logic levels of the line state detection signal;

generating, when the telephone network line is busy, a message to the visual telephone system indicating that the telephone network line is busy, and generating a switch control signal in response to the line state detection signal being at a logic level indicating the telephone network line is busy to disconnect said visual telephone system from the telephone network line to prohibit the visual telephone system from being connected to the telephone network line when the telephone network line is busy;

determining, when the telephone network line is not busy, whether a visual telephone communication mode is set by a specific key entry;

performing, when the visual telephone communication mode is not set by said specific key entry, voice telephone communication via said visual telephone system until the voice telephone communication is terminated;

connecting, when the visual telephone communication mode is set by said specific key entry, a modem to the telephone network line; and enabling said modem to perform visual telephone communication via said visual telephone system, and disabling the modem when the visual telephone communication is terminated.

10. The method of claim 9, further comprised of said detecting the operation state of the telephone network line corresponding to detecting a voltage on the telephone network line and comparing the voltage detected with a preset reference voltage to generate the line state detection signal.

11. The method of claim 9, further comprised of said message indicating that the telephone network line is busy corresponding to one of text, figure and voice messages.

12. A method of operating a visual telephone system, comprising the steps of:

effecting voice telephone communication via a telephone line connected to a telephone network with a telephone handset;

transmitting and receiving video and voice signals for visual telephone communication via said telephone line with a modem;

selectively connecting and disconnecting the telephone line to and from one of the telephone handset for voice telephone communication and the modem for visual telephone communication in response to a first switch control signal with an electrically controlled first switch;

selectively connecting and disconnecting the telephone line to and from the telephone network to the visual telephone system in response to a second switch control signal with an electrically controlled second switch;

detecting an operation status of the telephone line and generating a line status detection signal indicating whether the telephone line is busy with a detecting unit;

storing a message indicating the operation status of the telephone line in a memory; and controlling operation of the modem and reproduction of the message stored in said memory to alert a subscriber of the operation status of the telephone line in response to the line status detection signal, generating said first switch control signal in response to a specific key entry, and generating said second switch control signal in response to the line status detection signal with a control unit, said second switch prohibiting the visual telephone system from being connected to said telephone line when said telephone line is busy.

13. The method of operating a visual telephone system of claim 12, further comprised of the step of reading the message stored in said memory to alert the subscriber, via one of a sound card and a visual display, that the telephone line is busy, when the line status detection signal indicates that the telephone line is busy.

14. The method of operating a visual telephone system of claim 12, further comprised of the step of determining whether said specific key entry from the subscriber represents one of a visual telephone communication mode and a voice telephone communication mode, and generating said first switch control signal accordingly.

15. The method of operating a visual telephone system of claim 12, further comprised of the step of generating said first switch control signal exhibiting a first state for connecting the telephone line to the modem and activating the modem to establish the visual telephone communication with a remote visual telephone system via said telephone network, and exhibiting a second state for connecting the telephone line to the telephone handset and enabling the telephone handset to establish the voice telephone communication with a remote telephone handset via said telephone network.

16. The method of operating a visual telephone system of claim 12, further comprised of said detecting an operation status of the telephone line step comprising the steps of:

detecting a voltage on the telephone line;

generating a reference voltage; and comparing the detected voltage with the reference voltage, and generating the line status detection signal.

17. The method of operating a visual telephone system of claim 15, further comprised of said detecting an operation status of the telephone line step comprising the steps of:

detecting a voltage on the telephone line;

generating a reference voltage; and comparing the detected voltage with the reference voltage, and generating the line status detection signal.

18. The method of operating a visual telephone system of claim 12, further comprised of said detecting an operation status of the telephone line step being effected by a microcomputer having a line status detection routine incorporated therein for detecting a voltage on the telephone line, and for comparing a detected voltage with a preset reference voltage to generate the line status detection signal.

19. The method of operating a visual telephone system of claim 15, further comprised of said detecting an operation status of the telephone line step being effected by a microcomputer having a line status detection routine incorporated therein for detecting a voltage on the telephone line, and for comparing a detected voltage with a preset reference voltage to generate the line status detection signal.

* * * * *